United States Patent
LeCrone et al.

(10) Patent No.: US 7,281,157 B2
(45) Date of Patent: *Oct. 9, 2007

(54) METHOD AND APPARATUS FOR ENABLING CONSISTENT ANCILLARY DISK ARRAY STORAGE DEVICE OPERATIONS WITH RESPECT TO A MAIN APPLICATION

(75) Inventors: Douglas E. LeCrone, Hopkinton, MA (US); Eugene D. Pflueger, Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 392 days.

This patent is subject to a terminal disclaimer.

(21) Appl. No.: 10/785,614

(22) Filed: Feb. 24, 2004

(65) Prior Publication Data

US 2004/0193944 A1 Sep. 30, 2004

Related U.S. Application Data

(63) Continuation of application No. 09/613,118, filed on Jul. 10, 2000, now Pat. No. 6,754,682.

(51) Int. Cl.
*G06F 11/00* (2006.01)
(52) U.S. Cl. .......................................... 714/6
(58) Field of Classification Search .................. 714/6, 714/7
See application file for complete search history.

(56) References Cited

U.S. PATENT DOCUMENTS

| | | | |
|---|---|---|---|
| 4,207,609 A * | 6/1980 | Luiz et al. ..................... 710/38 |
| 5,379,398 A * | 1/1995 | Cohn et al. .................. 711/154 |
| 5,432,922 A * | 7/1995 | Polyzois et al. ................ 714/6 |
| 5,497,483 A | 3/1996 | Beardsley et al. |
| 5,497,783 A * | 3/1996 | Urick et al. .................. 600/585 |
| 5,692,155 A * | 11/1997 | Iskiyan et al. .............. 711/162 |
| 5,742,792 A | 4/1998 | Yanai et al. |
| 6,073,218 A * | 6/2000 | DeKoning et al. ........... 711/150 |
| 6,078,990 A * | 6/2000 | Frazier ....................... 711/114 |
| 6,101,497 A | 8/2000 | Ofek |
| 6,122,754 A * | 9/2000 | Litwin et al. ................... 714/4 |
| 6,173,377 B1 * | 1/2001 | Yanai et al. ................. 711/162 |
| 6,199,074 B1 * | 3/2001 | Kern et al. .................. 707/204 |
| 6,199,177 B1 * | 3/2001 | Blodgett ......................... 714/7 |
| 6,199,179 B1 * | 3/2001 | Kauffman et al. ............ 714/26 |
| 6,240,527 B1 * | 5/2001 | Schneider et al. ............ 714/21 |
| 6,243,828 B1 * | 6/2001 | Chase-Salerno et al. ........ 714/6 |
| 6,253,209 B1 * | 6/2001 | Chase-Salerno et al. . 707/104.1 |

(Continued)

*Primary Examiner*—Robert Beausoliel
*Assistant Examiner*—Elmira Mehrmanesh
(74) *Attorney, Agent, or Firm*—George A. Herbster

(57) ABSTRACT

A method and apparatus for enhancing data recovery in data processing systems in which applications span multiple logical devices. A data processing system includes multiple standard devices for storing data and corresponding BCV devices for, in one mode, operating as mirrors of those standard devices. If certain of those BCV devices are associated with the same data set, a CONSISTENT SPLIT operation controls the way in which each of these BCV devices is detached from its corresponding standard device and made available to another application. Each command to an application for controlling the BCV devices is translated into one or more request data structures that identify the BCV devices as being involved in a consistent split operation and that establishes a system lock out for those particular devices during which those devices are split from their respective devices in a consistent manner.

9 Claims, 9 Drawing Sheets

U.S. PATENT DOCUMENTS

| | | | |
|---|---|---|---|
| 6,263,209 B1 * | 7/2001 | Reed et al. | 455/456.3 |
| 6,282,672 B1 | 8/2001 | Bandoh et al. | |
| 6,308,284 B1 * | 10/2001 | LeCrone et al. | 714/6 |
| 6,370,626 B1 * | 4/2002 | Gagne et al. | 711/154 |
| 6,374,269 B1 * | 4/2002 | Ishikawa et al. | 707/205 |
| 6,397,350 B1 * | 5/2002 | Baskey et al. | 714/11 |
| 6,442,551 B1 * | 8/2002 | Ofek | 707/10 |
| 6,542,954 B1 * | 4/2003 | Aruga | 710/316 |
| 6,553,390 B1 | 4/2003 | Gross et al. | |
| 6,718,437 B2 * | 4/2004 | Don et al. | 711/114 |
| 6,718,447 B2 * | 4/2004 | Cochran | 711/162 |
| 6,766,469 B2 * | 7/2004 | Larson et al. | 714/7 |
| 7,089,386 B2 * | 8/2006 | Suzuki et al. | 711/162 |
| 7,093,087 B2 * | 8/2006 | Suzuki et al. | 711/161 |

* cited by examiner

METHOD AND APPARATUS FOR ENABLING CONSISTENT ANCILLARY DISK ARRAY STORAGE DEVICE OPERATIONS WITH RESPECT TO A MAIN APPLICATION This application is a continuation of U.S. patent application Ser. No. 09/613,118, filed Jul. 10, 2000 now U.S. Pat. No. 6,754,682.

BACKGROUND OF THE INVENTION

1. Field of the Invention

This invention is related to data processing systems with disk array storage devices and more specifically to a method and apparatus that enhances recovery operations in such disk array storage devices.

2. Description of Related Art

A conventional data processing system that handles large quantities of data generally includes a host and a disk array storage device, or DASD. A host generally includes one or more control processors and a main memory, and it executes programs and operates on data transferred to the main memory from the disk array storage devices as known in the art. Disk array storage devices, such as those manufactured and sold by the assignee of this invention, include many physical storage devices organized in logical storage volumes or logical devices. Such a disk array storage device operates with a host adapter or equivalent module that receives an input/output command from the host over a channel in a host dependent format. The host adapter translates that input/output command into a format that disk adapters recognize and use to direct operations at a logical device level. When an operation completes in the disk array storage device, a status word returns to the host adapter to report either the success of the operation or the reason for a failure.

Significant efforts have been made to enhance the operation and performance of disk array storage devices in order to enhance the performance of an incorporating data processing system one such effort has been directed to the enabling of ancillary disk array storage device operations with respect to main application programs. Particular emphasis has been placed upon enabling data backups without interrupting a main application program running on the host. For example, in a airlines reservation database application, it is obviously desirable to allow a database backup without interrupting any of the transactions underway with the various users on the system who are making or altering reservations.

U.S. Pat. No. 6,101,497 of Ofek for a Method and Apparatus for Independent and Simultaneous Access to a Common Data Set, assigned to the same assignee as this invention, discloses a concept for making such an improvement. In accordance with that disclosure, certain physical disk drives in a disk array storage device are configured to be available to an application. These are called "standard devices". Other logical devices are configured to act either as a mirror for a standard logical device or to be split to provide a copy of the data on the standard device for some other purpose. In the context of the systems manufactured by the assignee of this invention, the second logical devices are called "BCV devices". Using the foregoing airline reservation systems as an example, the invention disclosed in U.S. Pat. No. 6,101,497 enables a BCV device to attach to a standard device thereby to act as a mirror. Generally speaking, anytime after the BCV device has achieved synchronism with the standard device, the BCV device can be split, or detached, from the standard device. The copy of the data on the BCV device is then available to other applications, such as a backup application. This allows the other application to act on the data on the BCV device independently of and simultaneously with the continued operation of the main application with data stored on the standard device.

As the use of such data processing systems has grown, certain issues that impact the splitting of a BCV device from its corresponding standard device have appeared. These include an issue of pending write data operations. Disk array storage devices of many manufacturers, including those of the assignee of this invention, utilize cache memory to enhance performance, particularly for write operations. When a host issues a write command, the data to be written transfers only to the cache memory before the operation is signaled to be complete back to the host. That data remains in the cache for some interval before that data, or overwritten data to the same location, transfers to the logical device itself. During that transient interval in the cache, the operation is complete with respect to the host, but pending with respect to physical disk device. The entry in the cache is labelled as being a "write pending" entry. The process of transferring a "write pending" entry to a logical device is called "destaging".

With BCV and like devices, some mechanism must manage write pending entries so that the BCV device, after it is split, accurately reflects the data on the standard device at the time of the split, updated by any write pending entries that were in the cache memory at the time that the split occurred.

In the system described in the foregoing reference, the BCV device stops acting as a mirror in response to a split command. Then the standard device with which the BCV device operates as a mirror is locked for an interval during which all write pending entries and previous write requests in the cache are managed. No write requests or other access to either the standard device or the BCV device can occur while the lock is in place. After the lock is acheived, a program module performs a number of functions on a track-by-track basis. If a write pending entry is associated with a track, the module immediately performs the necessary steps for processing that write pending entry. If the previous write operation has occurred and been destaged, the module also performs any updates to track invalid bits. After this process has been completed for all tracks in the logical volume, the lock is released. This process can be very time consuming, particularly if there are a large number of write pending entries at the time the split occurs. It was found that it was possible that the lock could be in place for seconds or even minutes under certain conditions and these delays were not acceptable in many applications.

U.S. Pat. No. 6,370,626 to Gagne et al. discloses a Method and Apparatus for Independent and Simultaneous Access to a Common Data Set that reduces this lock time by implementing an "instant split" operation. When an "instant split" command is received, the BCV device immediately detaches from the standard device and becomes accessible to an alternate application. This occurs under a lock condition that lasts in the order of microseconds during which certain control operations are accomplished but no data is transferred and no write pending entries are managed. Immediately thereafter the lock is released. Various processes in the disk array storage device thereafter manage the write pending entries in an orderly fashion even as the main application interacts with the standard device and the alternate application, such as a backup application, interacts with the BCV device.

The introduction of the instant split command overcame the unacceptable lock times of the original split command. However, applications continue to grow in complexity and the data associated with those applications continues to grow. Whereas an application and associated data may originally have been stored on a single standard device, such applications and associated data now may be stored on multiple standard devices. Some applications now require storage that exceeds the capacity of a single disk array storage device necessitating that the distribution of a single application over two or more disk array storage devices with hundreds of standard devices. In a database application, for example, one standard device may contain the database data while another standard device contains an the associated log file. In such multiple device applications it was possible to institute a multiple instant split operation by issuing a series of discrete instant split operations for all the BCV devices. These would then be processed.

However, each discrete instant split operation was dispatched separately, so the order in which the instant splits occurred on different BCV devices was unpredictable. Consequently it was possible for the application program to write to a logical device that was queued to be split, but for which the split had not yet issued. This could produce inconsistent data. For example, dependent write operations in database applications involve three write operations. The first write operation transfers an entry to a log file through the cache establishing the fact that data is to be written. The second write operation transfers the data to the cache for destaging to a standard device. The third write operation transfers another log entry to the cache for the log file; this entry indicates that the operation is complete. If a multiple instant split operation is conducted so that the instant split for the logical volume containing the data is completed first, the data file may be updated without updating the log file in the BCV devices. There would be no record of the data change in the split BCV devices. Alternatively if the log files were destaged and updated before the data file was updated, the log file could indicate the completion of an operation without the data actually having been transferred to its split BCV devices. Consequently in either event, the data in the split BCV device will be inconsistent.

It is difficult at best then to identify any such inconsistent data, particularly when dependent data transfers are involved. Consequently it becomes very difficult to recover data in the event of some type of malfunction. What is needed is a method and apparatus for enabling such instant split operations to occur such that related data on multiple split BCV devices or the like is consistent thereby to prevent any data corruption.

SUMMARY

Therefore it is an object of this invention to provide a method and apparatus for enhancing recovery operations in disk array storage devices.

Another object of this invention to provide a method and apparatus for enabling a group of related logical devices operating as mirrors to be split for operation with other applications while maintaining data consistency.

In accordance with one embodiment, this invention is implemented in a data processing system including a host and at least one disk array storage device including a plurality of first logical devices for interacting with a first application and including a second logical device corresponding to each first logical device that can interact in a first mode as a mirror for a corresponding first logical device and that can interact in a second mode with a second application. A command is issued to shift a plurality of identified second logical devices from the first mode to the second mode in a consistent fashion. In response a request data structure is generated for each of the second logical devices identified in the command. Then all interactions between the first application and the first logical devices corresponding to the identified second logical devices are disabled. Next a shift of all of the identified second logical devices to the second mode after said disablement. Upon completion of the shift interactions between the first application and the standard logical devices corresponding to the identified second devices resume and a return to the host is generated to indicate that the shift to the second mode has been completed whereupon the data in the identified second logical devices is consistent.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATED EMBODIMENTS

Figure 1:
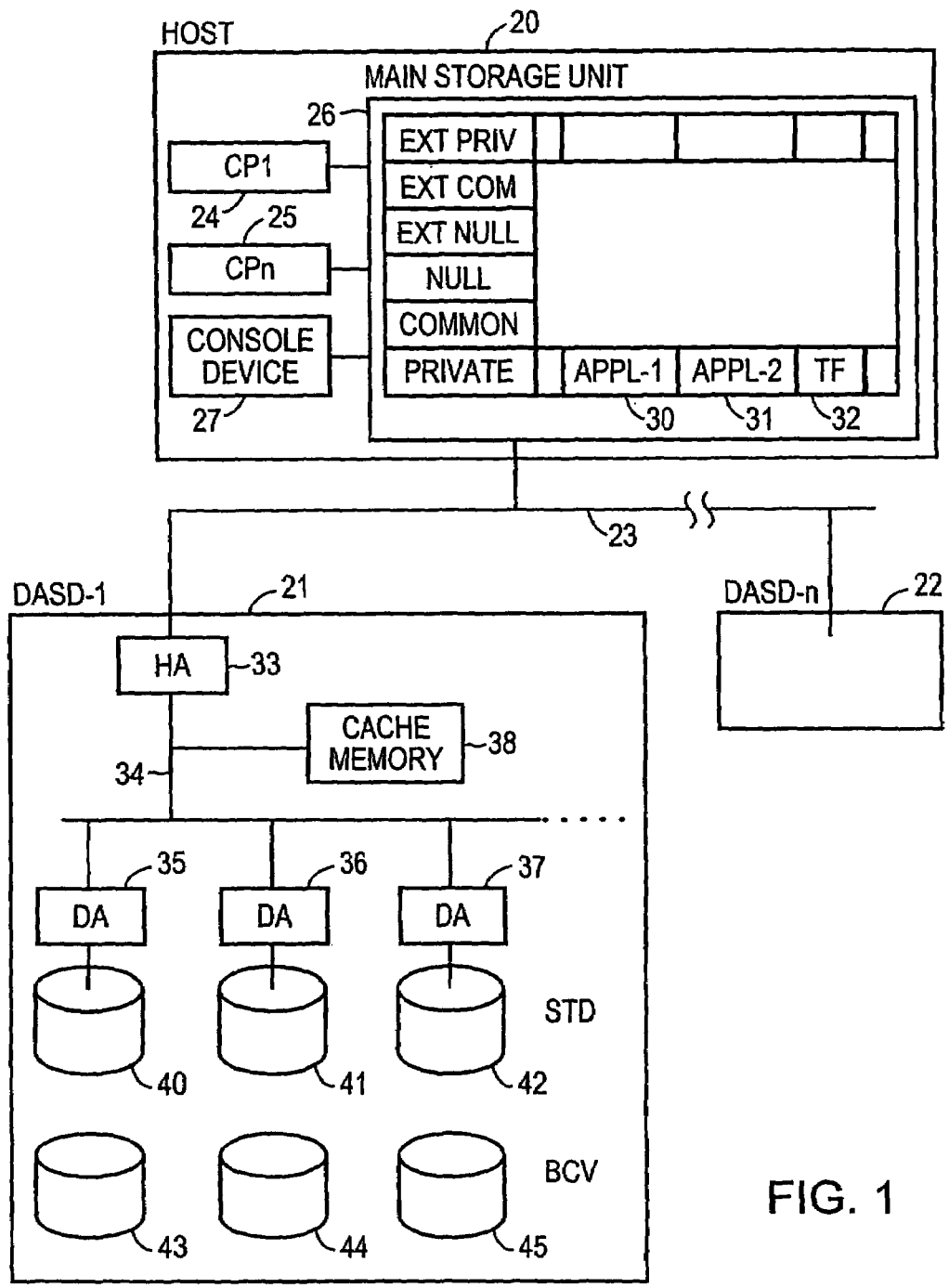
FIG. 1 is a block diagram of a processing system adapted for implementing this invention.

There are many possible examples of data processing system configurations adapted for utilizing this invention. FIG. 1 depicts one such configuration in which a host 20 connects to multiple storage controllers, such as a first disk access storage device (DASD-1) 21 and another disk access storage device (DASD-n) 22. All transactions required by the host 20 are carried out with the storage controllers such as the DASD-1 and DASD-n devices 21 and 22. In this particular embodiment a bus 23, that may comprise a single bus or an array of parallel buses or channels connects the host 20 to the DASD-1 21 and DASD-n 22 storage controllers or devices.

Hosts, such as the host 20 in FIG. 1, operate utilizing some commercially available operating system, such as the IBM MVS operating system. Such a host generally includes a plurality of control processors, with FIG. 1 depicting two control processors CP(1) and CP(n) identified by reference numerals 24 and 25, respectively. These control processors communicate with a main storage unit 26 that, as known, is divided into private, common, and extended private storage areas. A control console device 27 permits an operator to communicate with the system for performing a number of configuration, diagnostic and other procedures independently of operations that occur in response to any application programs.

When any application program is loaded into the system, the MVS operating system provides an address space for that program. FIG. 1 depicts address spaces 30 and 31 for two user applications (APPL-1 and APPL-2) and an address space 32 assigned to a Time Finder (TF) application that implements this invention.

The DASD-1 storage controller or data storage facility 21 includes a host adapter (HA),33 that receives the requests from a host such as the host 20. It is a programmable device that can initially process these requests to determine a number of characteristics and perform initial contacts in syntax error checking. In essence, the host adapter converts a command in a host dependant format into a series of commands that are transferred over a bus 34 in an alternative format thereby to allow a series of disk adapters 35, 36 and 37 to perform appropriate operations in response to the host command.

The bus 34 can be constituted by a single or multiple bus structure and also connects to a cache memory 38. The cache memory 38 acts as a buffer and stores data including write pending data in accordance with a number of functions. Certain areas of the cache memory 38 will be devoted to cache slots for containing write pending entries and another area will be devoted to control.

Each disk adapter, such as any one of the disk adapters 35 through 37, provides an interface to the main storage elements. Like the host adapters, each disk adapter is a programmable device that responds to commands from the host adapter. A system manager (not shown) connects to one of the disk adapters to allow configuration change and other functions to be performed throughout the data storage facility.

Each disk adapter connects to one or more physical disk drives. Each physical disk drive may contain one or more logical volumes or devices. In addition a single logical volume may expand more than one physical device. For purposes of explanation, FIG. 1 depicts logical volumes particularly a logical volume 40 connected to the disk adapter 35, a logical volume 41 connected to the disk adapter 36 and a logical volume 42 connected to the disk adapter 37.

It is assumed that the disk array storage device 21 (DASD-1) has been configured by the system manager to include at least three BCV volumes 43, 44 and 45 as described in the above identified U.S. Pat. Nos. 6,101,497 and 6,370,626. It also is assumed that the configuration establishes the relationship such that the BCV devices 43, 44 and 45 attach to the standard devices 40, 41 and 42 respectively. Each disk array storage device in the data processing system, such as the DASD-n device 22, would have a similar or analogous structure and operation.

In accordance with this configuration, the TF application in the address space 32 can issue an ESTABLISH command or commands that enable a designated one or ones of the BCV devices 43, 44 and 45 to attach to their respective standard devices 40, 41 and 42 and then to come into synchronism. More specifically, the TF application in address space 32 provides a mechanism for controlling BCV devices. Prior art versions of the TF application implement the previously described ESTABLISH, SPLIT, INSTANT SPLIT, MULTIPLE INSTANT SPLIT commands and other commands useful in controlling the operation of BCV devices. The TF application in address space 32 is modified in accordance with the invention to enable a consistent split operation whereby a group of BCV devices with a common data set or application can be split with an assurance that the data on all the split BCV devices will be consistent. A specific implementation of a command included in such a BCV control, or TF application, will include an operator, a sequence number, a BCV address, a type of split operation plus optional arguments. In one form a command for implementing this invention is:

SPLIT seq#, bcv, CONS (LOCAL (Byp),Timeout (nnnn))

The "SPLIT" operator and the "seq#" argument operate as in the prior art with the number of the seq# argument distinguishing all BCV's that are to be split in a consistent manner. That is, if it is desired to split the BCV devices 43 and 44 of FIG. 1 in a consistent manner, they have one sequence number (e.g. seq#=10), while another consistency group including other BCV devices has another sequence number (e.g. seq#=11).

The BCV address identifies a specific BCV device by number. If multiple BCV devices are involved, as they will be in a consistent split, there are two alternatives. If the BCV devices have random device numbers, separate split commands are included for each BCV device. If two or more of the BCV devices have consecutive addresses, the range can be included in the BCV address field.

As previously indicated, there are several types of split operations available including the conventional split command as described in U.S. Pat. No. 6,101,497, a single instant split command as describe in U.S. Pat. No. 6.370,626 and a multiple instant split command. Following the BCV address field, a field includes "CONS" to designate a consistent split operation of this invention. Other values at this field indicate other split operations.

The optional LOCAL command anticipates other types of arrangements but has only been implemented so that only a "LOCAL" value has validity. The "bypass" argument bypasses conventional on-line checks for standard devices on other operating systems, such as other MVS operating systems. The "timeout" argument establishes an interval during which the consistent split must be carried out. In a specific implementation, there is a default value of 15 seconds. This field allows the timeout interval to be reduced.

Figure 2:
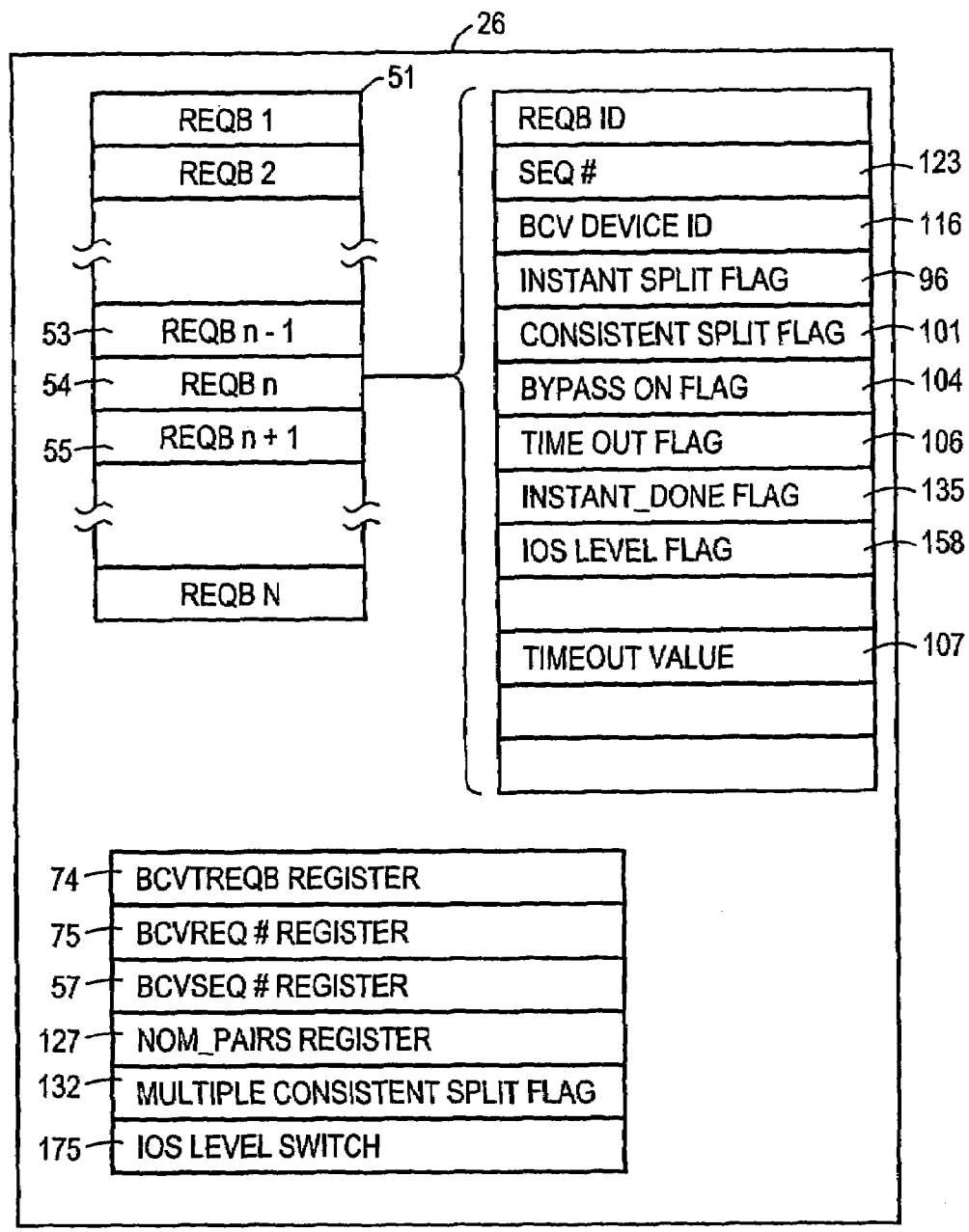
FIG. 2 is a block diagram that depicts certain features of an application that implements this invention.

When the TF application in address space 32 is started as a batch program in the specific embodiment of this invention, it initializes various buffers and registers. FIG. 2 depicts certain buffers, registers and other memory locations that are useful in understanding this invention. More specifically FIG. 2 depicts, in a list form, various data structures and registers. These are shown for informational purposes, the exact location and implementation will be optimized for a specific implementation of this invention.

Figure 3:
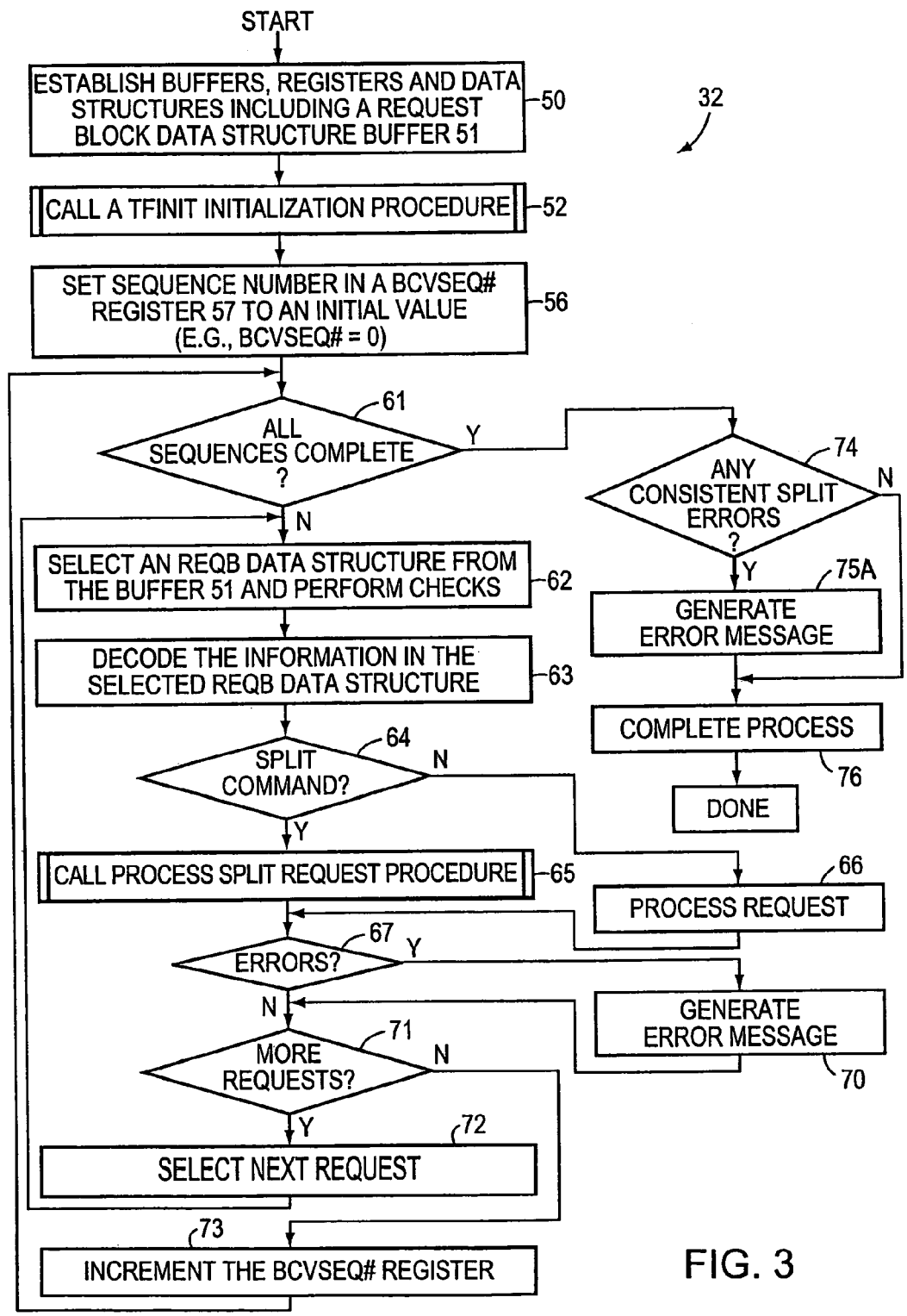
FIG. 3 is a basic flow diagram of the operation of a TF application shown in FIG. 1.

FIG. 3 is an overview of the TF application in address space 32. Initially, step 50 establishes the buffers and data structures including a buffer 51 shown in FIG. 2 for request block (REQB) data structures that control ensuing operations. Step 52 calls a TFINIT initialization procedure. This procedure processes each TF application command, parses that command and produces one or more REQB data structures. If a command defines a range of BCV devices, the TFINIT initialization procedure will produce one REQB data structure for each BCV device. When the initialization procedure ends, the buffer 51 shown in FIG. 2 contains a plurality of REQB data structures. FIG. 2 depicts several such REQB data structures including an REQB(n) data structure 54, an REQB(n−1) data structure 53 and an REQB (n+1) data structure 55 by way of example.

As described earlier, each command contains a sequence number. Step 56 in FIG. 3 sets a global BCVSEQ# register 57 to an initial value (e.g. BCVSEQ#=0). Initially step 61 determines that additional sequence numbers exist and transfers control to step 62 that selects and tests a first REQB data structure. Step 63 decodes the selected REQB data structure. If selected REQB data structure corresponds to any split command, step 64 diverts control to step 65 that calls a "PROCESS SPLIT REQUEST" procedure as a subroutine. This procedure processes the various split requests that were defined in the TFINIT initialization procedure and effects the split as will be described more fully hereinafter. If step 63 decodes any other command, control passes to step 66 that includes procedures for processing such commands.

After one of the procedures has been completed, whether in response to step 65 or step 66, an error check occurs. If an error is detected, step 67 enables step 70 to generate an appropriate error message. Whether or not an error message is required, step 71 determines whether any more REQB data structures require analysis. If more REQB data structures exist, step 71 transfers control to step 72 to select a next REQB data structure for analysis and control returns to step 62.

This loop beginning with step 62 and ending with step 72 continues until all the REQB data structures are processed. Then step 71 transfers control to step 73 to select a next sequence number and then transfers control back to step 61 to determine if all sequences are complete.

The PROCESS SPLIT REQUEST procedure called in step 65 performs three basic operations. First, it prevents any write operations to any of the standard device involved in the split. In an MVS operating system environment, the PROCESS SPLIT REQUEST procedure requests the MVS operating system to raise the IOS level for each standard device attached to a BCV device in the consistency group. Next the procedure issues the necessary INSTANT SPLIT commands to each of the BCV devices in the group as defined by the sequence number. Third, the system resets the IOS level for each standard device associated in the consistency group. This entire operation occurs in a short time interval and is transparent to an application program interacting with a standard device even when the split involves hundreds of BCV devices. As with the instant split operation of U.S. Pat. No. 6,370,626 the management of all the write pending entries occurs after the consistent split has occurred.

When the REQB data structures associated with all sequence numbers have been analyzed, step 61 transfers control to step Image Page 10 74. If any errors have occurred, step 75A generates an appropriate error message. Step 75A then passes control to step 76, as does step 74 if no errors exist; and step 76 then performs any housekeeping operations to end the instance of the TF application.

So long as input commands are available, step 83 will enable step 84 to read an input command, such as a split command identified above. Step 85 parses that command to obtain its operator and various arguments. Step 86 obtains the sequence number from the command and saves in the BCVSEQ# register 57. Next the TFINIT procedure 51 decodes the command. If the command is a split command, step 87 transfers control to step 90 that calls a process SPLIT REQUEST procedure. During this procedure as described in more detail later, other parameters of the split command are used to produce one or more REQB data structures representing the information in the split command. If the command is other than a split command, it is processed by a procedure 91 that is not disclosed in any detail because it forms no part of this invention. Once a command is processed, step 92 increments the BCVREQ#register 75 whereby the BCVREQ# register 75 maintains a running total of the number of commands that have been generated. Control then passes from step 92 back to step 83 to analyze another input command and this continues until all the commands have been read. When all the commands have been read, step 83 shifts control to return the system to step 56 in FIG. 3.

Figure 4:
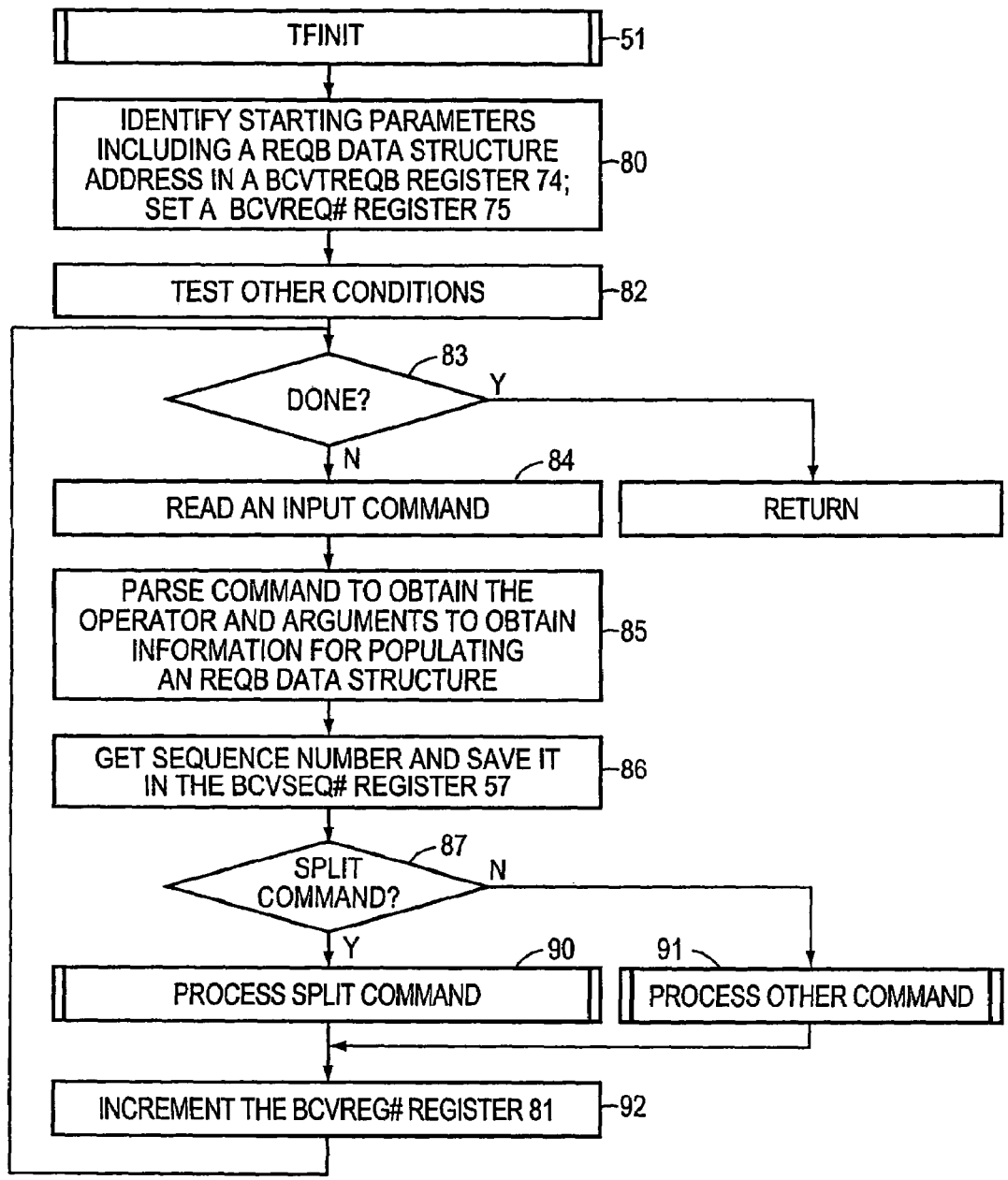
FIG. 4 is flow diagram of a TFINIT initialization procedure shown in FIG. 3.
Figure 5:
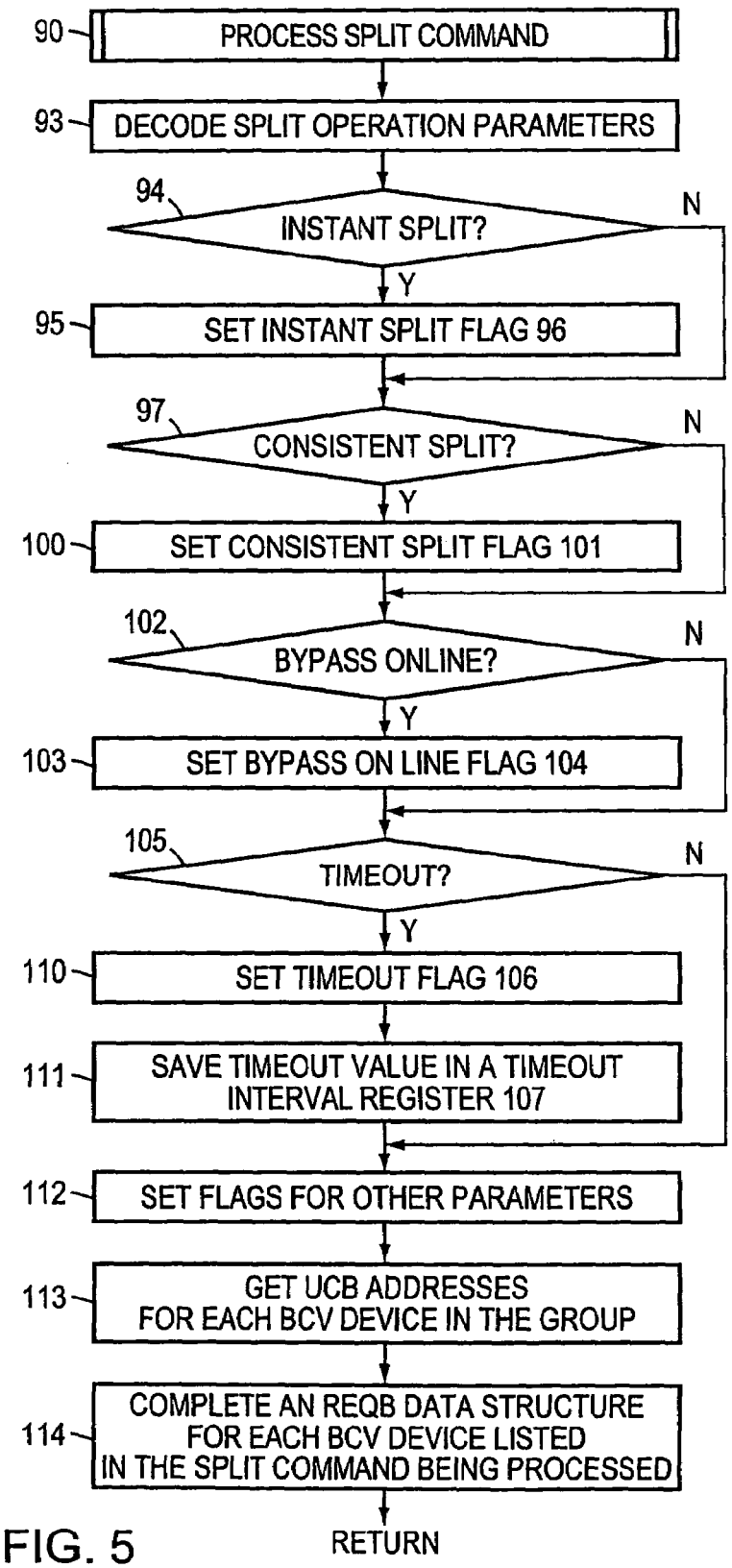
FIG. 5 is a flow diagram of a PROCESS SPLIT COMMAND operation shown in FIG. 4.

When step 90 in FIG. 4 calls the PROCESS SPLIT COMMAND procedure, step 93 in FIG. 5 further decodes the parsed command generated at step 85 of FIG. 4 for the purpose of establishing various flags and values. Several flags that are important to this invention are identified. If the process is an instant split, as it will be for a consistent split operation, step 94 transfers control to step 95 that sets an INSTANT SPLIT flag 96 shown in FIG. 2. Step 97 transfers control to step 100 to set a CONSISTENT SPLIT flag 101. Normal operations of a storage controller include verifying the existence of a BCV device and its corresponding standard device particularly if the standard device is associated with multiple operating systems, such as multiple images of the MVS operating system. The bypass argument described above controls whether this test runs. If the optional bypass argument is set to an active state in the command, step 103 sets the BYPASS ON-LINE flag 104. Step 105 determines if there is a TIMEOUT to control a timeout flag 106 and a timeout interval register 107. If a timeout exists, step 105 diverts control to step 110 that sets the TIMEOUT flag 106. Step 111 stores the interval included in the command. Once the process in FIG. 5 establishes these flags, step 112 sets other flags corresponding to other parameters that again form no part of this invention but are known to those skilled in the art.

As previously indicated, a single split command may identify one or more BCV devices. Step 113 determines whether there is a UCB (unit control block) for each BCV device in the group by testing for non-zero addresses. When this operation is complete, control transfers to step 114. Step 114 completes a REQB data structure for each BCV device identified in the split command being processed. That is, if the split command identifies a single BCV device, one REQB data structure will be completed. If three BCV devices are listed in sequence, step 114 will replicate the data for REQB data structure to provide a one REQB data structure for each of the identified BCV devices. Each REQB data structure will include the identification of its corresponding BCV device in a BCV DEVICE ID field 116. When this process is complete, control passes back to step 92 in FIG. 4 to increment the BCVREG#register 81.

In essence, the TFINIT initialization procedure 51 establishes a number of REQB data structures in the buffer 52 of FIG. 2 for each BCV device. Each REQB data structure identifies the type of operation, the BCV device that is being controlled and other relevant information. For purposes of this discussion, an INSTANT SPLIT flag 96, CONSISTENT SPLIT flag 101, BYPASS-ON flag 104 and TIMEOUT flag 106 and TIMEOUT VALUE 107 are included in each such REQB data structure. As will now be apparent, this operation occurs in parallel with any interaction between the APPL-1 application 30 and the DASD-1 storage controller 21 particularly the standard devices 40, 41 and 42. Thus changes during the operation of the TF application in address space 33 attaches and splits BCV devices 43, 44 and 45 transparently.

Figure 6:
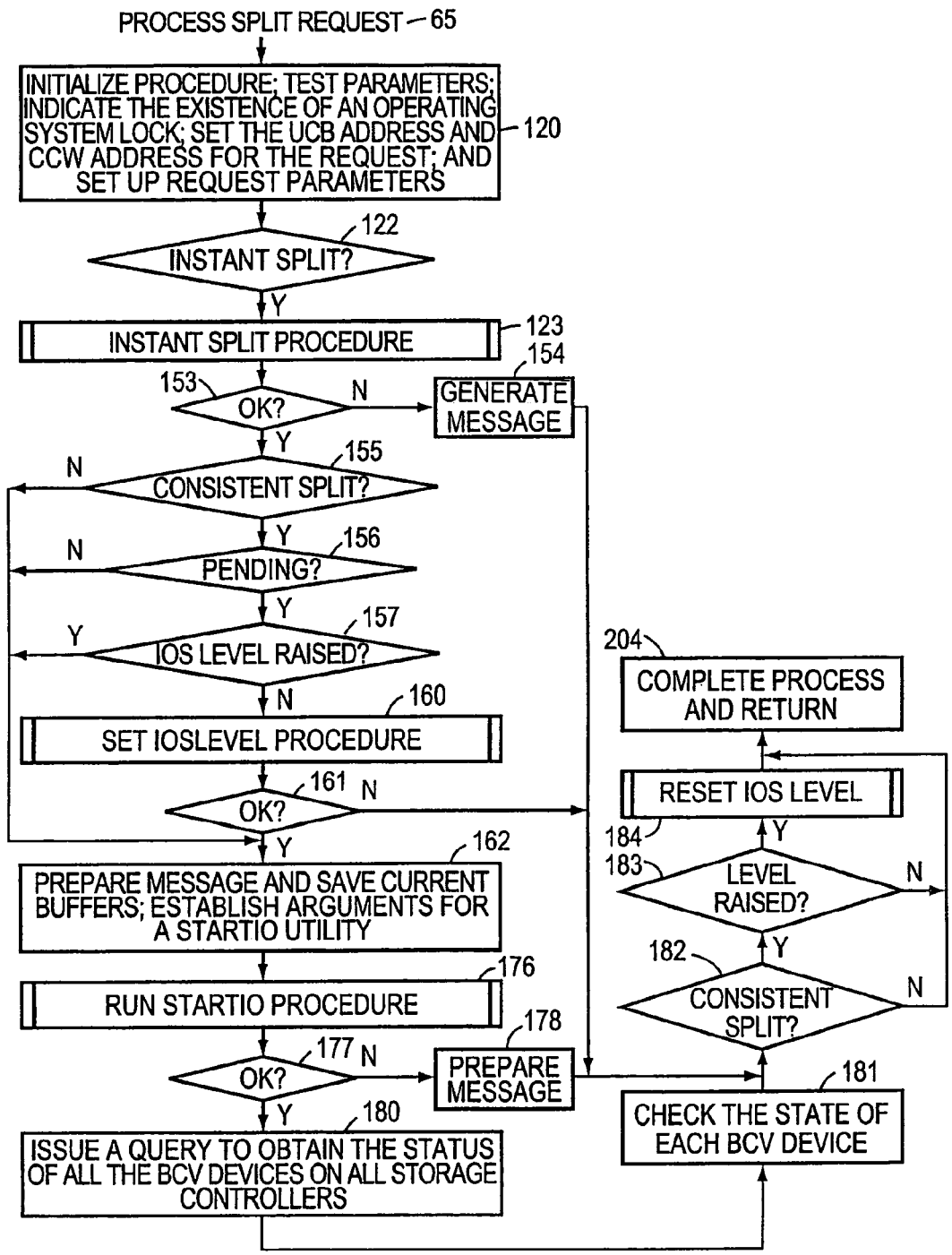
FIG. 6 is a flow diagram of a PROCESS SPLIT REQUEST procedure shown in FIG. 3.

When the TF application in address space 32 of FIG. 1 decodes a split command in step 64, step 65 calls a PROCESS SPLIT REQUEST procedure that obtains information about the various requests and issues an appropriate split command for that request. This procedure begins with step 120 in FIG. 6 that performs an initialization procedure and tests various parameters. In addition step 120 indicates whether an operating system lock exists. It also sets a UCB address and CCW (Channel Control Word) address for the request and sets various other request parameters. All these procedures are known in the art.

If the INSTANT SPLIT flag 96 for the REQB data structure being analyzed is set, step 122 transfers control to step 123 that calls an INSTANT SPLIT procedure. The INSTANT SPLIT procedure determines whether there are other REQB data structures in the buffer 51 that have the same sequence number as established by the sequence number entry 123 in FIG. 2. This assures that multiple INSTANT SPLITS at the same level will be processed in one system calling procedure.

Figure 7:
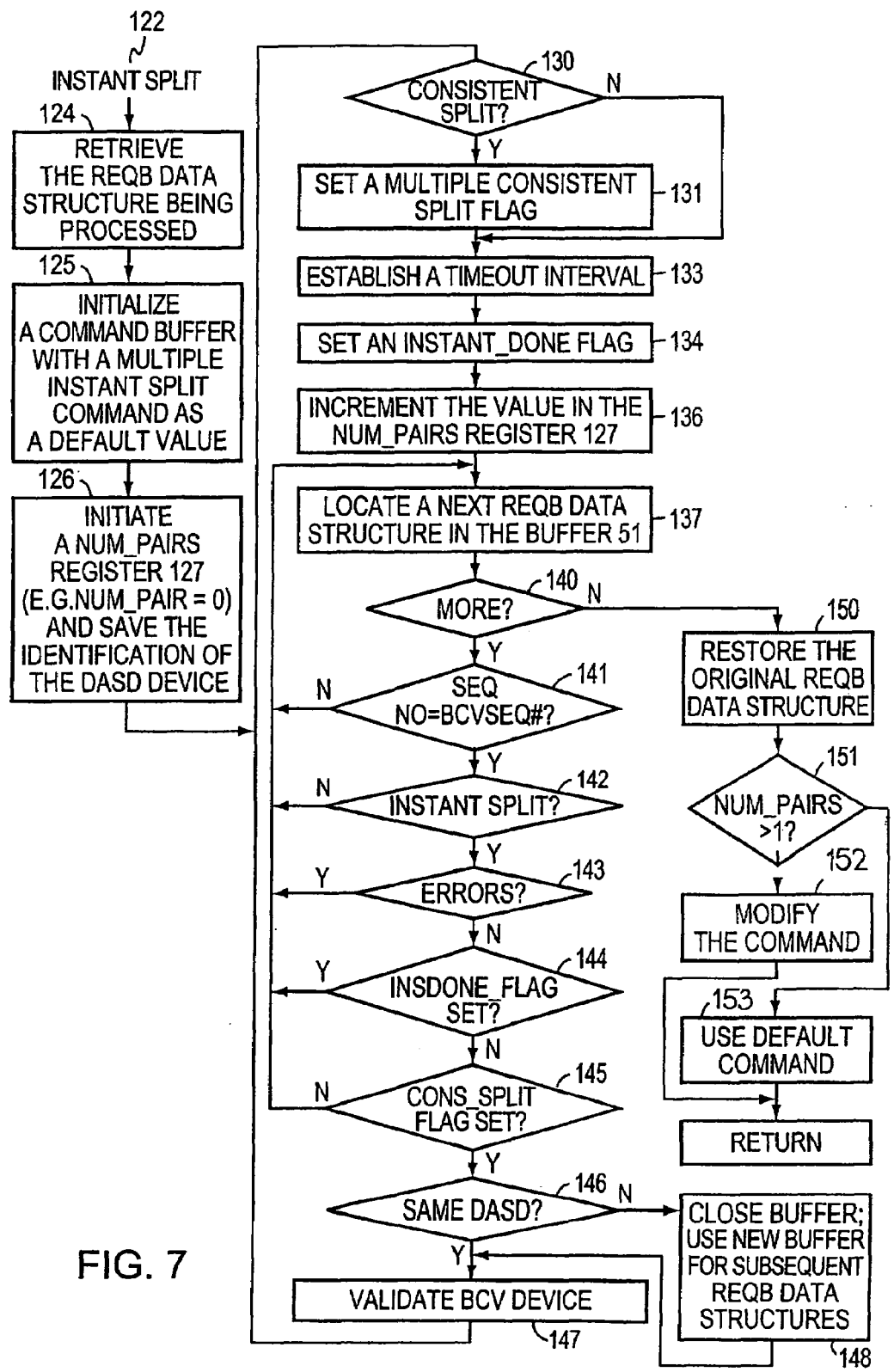
FIG. 7 is a flow diagram of an INSTANT SPLIT procedure shown in FIG. 6.

FIG. 7 depicts this INSTANT SPLIT procedure 122 in greater detail. The procedure begins when step 124 retrieves the REQB data structure being processed and the initializes a command buffer with the MULTIPLE INSTANT SPLIT command as a default value in step 125.

Step 126 then initiates a NUM PAIRS register 127 shown in FIG. 2 as a global register. Typically the register 127 will be set to a zero value. Step 126 also saves the identification of the DASD device. Step 130 examines the CONSISTENT SPLIT flag 101 associated with the REQB data structure being analyzed. If that flag 101 is set, step 131 sets a MULTIPLE CONSISTENT SPLIT flag.

Step 133 compares the value in the TIMEOUT VALUE register 107 in FIG. 2 with a default TIMEOUT. Typically step 133 then selects the shorter of the two intervals to establish the TIMEOUT interval.

If the REQB data structure defines other than a CONSISTENT SPLIT operation, control transfers from step 130 to step 133. Control also passes from step 133 to step 134 to set an INSTANT DONE flag 135. Step 136 increments the value in the NUM PAIRS register 127 thereby to indicate that one standard-BCV device pair exists.

Now the INSTANT SPLIT procedure looks at all the remaining REQB data structures to determine if any other REQB data structures in the buffer 51 should be grouped with the REQB data structure being analyzed for a consistent split. Step 137 begins a loop that examines these next REQB data structures. Initially step 140 transfers control to step 141 that determines if the sequence number for this next REQB data structure has the same value as the sequence number for the REQB data structure being analyzed. If it does, step 142 determines whether the next REQB data structure has a INSTANT SPLIT component. If it does, step 143 determines whether any errors exists. If none exist, step 144 looks to the INSTANT DONE flag in the next REQB data structure to determine whether it is set. If it has been set, there is no need to further process that particular REQB data structure. Next step 145 determines whether the CONSISTENT SPLIT flag for this next REQB data structure is set. Step 146 then determines whether the same disk array storage device is involved.

If the sequence of tests represented by steps 140 through 146 indicate that the next REQB data structure is an INSTANT SPLIT related to the INSTANT SPLIT being analyzed and it has not yet been split and it is to be involved in a consistency split operation to the same digital array storage device, control passes from step 146 to step 147 that validates the BCV device as being associated with a standard device. Assuming a validation occurs, control passes back to step 130 for an analysis of this next REQB data structure. If the next REQB data structure is not from the same DASD storage controller, step 148 closes the buffer in use and produces a new buffer for use with these other DASD storage controllers. It then transfers control to step 147 to validate the BCV device and returns to step 130 to continue processing REQB data structures.

When all the remaining REQB data structures in the buffer 51 are examined in this loop, control transfers from step 140 to step 150 that restores the original REQB data structure for further analysis. Step 151 then examines the value in the NUM PAIRS register 127. As previously indicated, in the specific example, 126 initializes the NUM PAIRS register 127 to zero and increments the value to "1" during the analysis of the original REQB data structure. If any of the next REQB data structures pass the test of steps 130 through 146, the value is incremented. Thus if the value in the NUM PAIRS register 127 is greater than one, control passes to step 151 that will utilize the default MULTIPLE INSTANT SPLIT command. Otherwise control transfers to step 152 that modifies the command from the default to a conventional split command. After this operation the INSTANT SPLIT procedure and control returns to step 153 in FIG. 6 that determines whether any errors occurred during this process. If an error occurs, step 154 generates a message.

Assuming the INSTANT SPLIT procedure completes successfully, control passes from step 153 to step 155 that again tests the CONSISTENT SPLIT flag 101. If the CONSISTENT SPLIT flag is set, and step 156 determines that the request is not pending from activities involving another storage controller, such as the DASD-n storage controller in FIG. 1, a test is made to determine whether the 105 level, an MVS operating system feature, is raised in step 157 by testing an IOS LEVEL flag 158 in FIG. 2. If it has previously been raised, no action occurs. Otherwise step 160 calls a SET IOS LEVEL procedure. If the procedure completes in a positive fashion, step 161 transfers control to step 162. If for any reason the REQB data structure either is not for a CONSISTENT SPLIT, is not pending or already has its 105 LEVEL flag raised, control transfers to step 162 without setting the 105 LEVEL flag.

Figure 8:
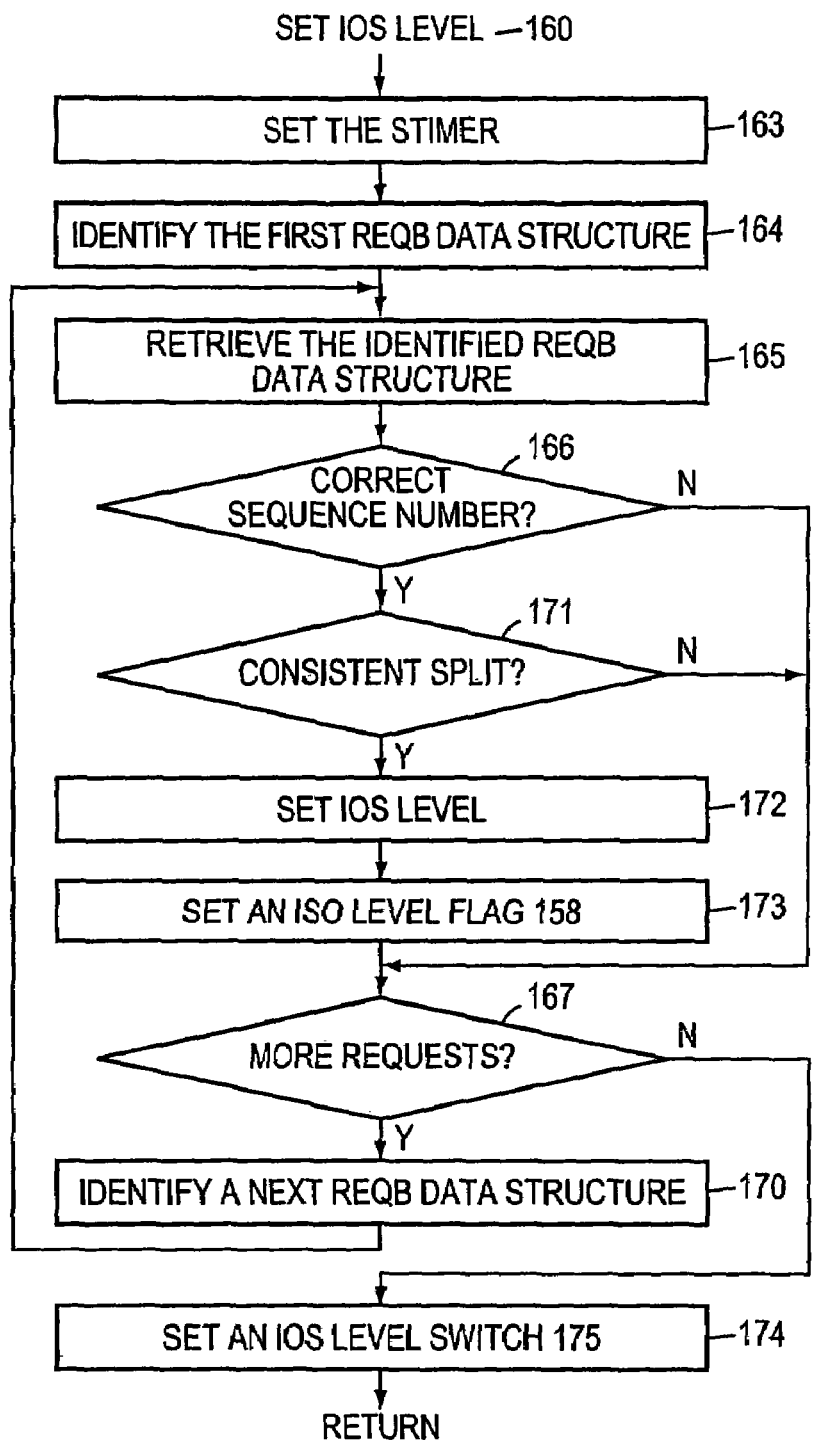
FIG. 8 is a flow diagram of a SET IOS LEVEL procedure shown in FIG. 6.

FIG. 8 depicts the SET IOS LEVEL procedure in more detail. The SET IOS LEVEL procedure starts by setting an STIMER in step 163. The STIMER is a timer mechanism available in the MVS operating system and begins to time out with step 163. The number is set from the value determined in step 133 of FIG. 7. Step 164 identifies a first REQB data structure and retrieves that data structure in step 165. Step 166 determines whether the retrieved sequence number in that REQB data request is the same number that is being analyzed as defined in the BCVSEQ# register 57. If it is not, no further steps need be taken and control transfers to step 167 to identify a next request in step 170.

If the sequence number is correct, step 166 transfers to step 171 to determine if the CONSISTENT SPLIT flag, corresponding to the CONSISTENT SPLIT flag 101 shown in FIG. 2, is set for the particular REQB data structure. If it is not, control transfers to step 167 to obtain a next request. If, however, the REQB data structure is for a CONSISTENT SPLIT operation with the same sequence number, step 172 sets the IOS level for the corresponding standard device and step 173 sets a flag to indicate that the IOS level for that REQB data structure is set.

After all the requests are complete, step 167 then transfers to step 174 that sets an IOS LEVEL switch 175 indicating that at least one REQB data structure has been set.

Referring again to FIG. 6, when the SET IOS LEVEL procedure of step 160 is complete and the REQB data structure is the first data structure involving a CONSISTENT SPLIT, all the IOS levels for each standard devices associated with the BCV devices identified by those REQB data structures are raised. Therefore no interaction with any standard device is associated with the BCV devices included in the consistent split operation.

Step 162 prepares various messages, saves current buffers and establishes the arguments that will be necessary for enabling a utility, such as a STARTIO utility in the MVS operating system, to initiate an INSTANT SPLIT operation with each of the BCV devices corresponding to those for which the IOS level has been raised. Step 176 in FIG. 6 then calls a RUN STARTIO procedure that then transmits INSTANT SPLIT commands to each of the BCV devices that are in the consistency group. Consequently all the BCV devices in the consistency group can initiate the INSTANT SPLIT commands while access to their corresponding standard devices are blocked. The RUN STARTIO procedure operates iteratively. During each iteration it generates INSTANT SPLIT commands for all the identified REQB data structures in one buffer. If more than one buffer exists because there are multiple storage controllers as determined by step 146 in FIG. 7, successive iterations of the RUN STARTIO procedure will generate INSTANT SPLIT commands for the identified REQB data structures in each of those buffers. When the transfer of all these INSTANT SPLIT commands is complete, step 177 determines whether any errors occurred. If an error occurs, step 178 prepares a message.

If no errors occur, step 177 passes control from step 176 to step 180 that issues a query to obtain the status of all the BCV devices and step 181 that checks the state of each BCV device. Steps 180 and 181 essentially determine whether any BCV devices in any consistency group remains in a transition state that exists from the time the application issues a STARTIO command until an addressed BCV acknowledges the receipt of a command. Steps 180 and 181 operate in an iterative fashion until all operations are complete or until the STIMER function times out.

Steps 182 and 183 determine whether the CONSISTENT SPLIT flag is set and whether the IOS levels have been raised as indicated by the IOS LEVEL switch 175. If both conditions exist, steps 182 and 183 transfer control to step 184 that calls a RESET IOS LEVEL procedure shown more particularly in FIG. 9.

Figure 9:
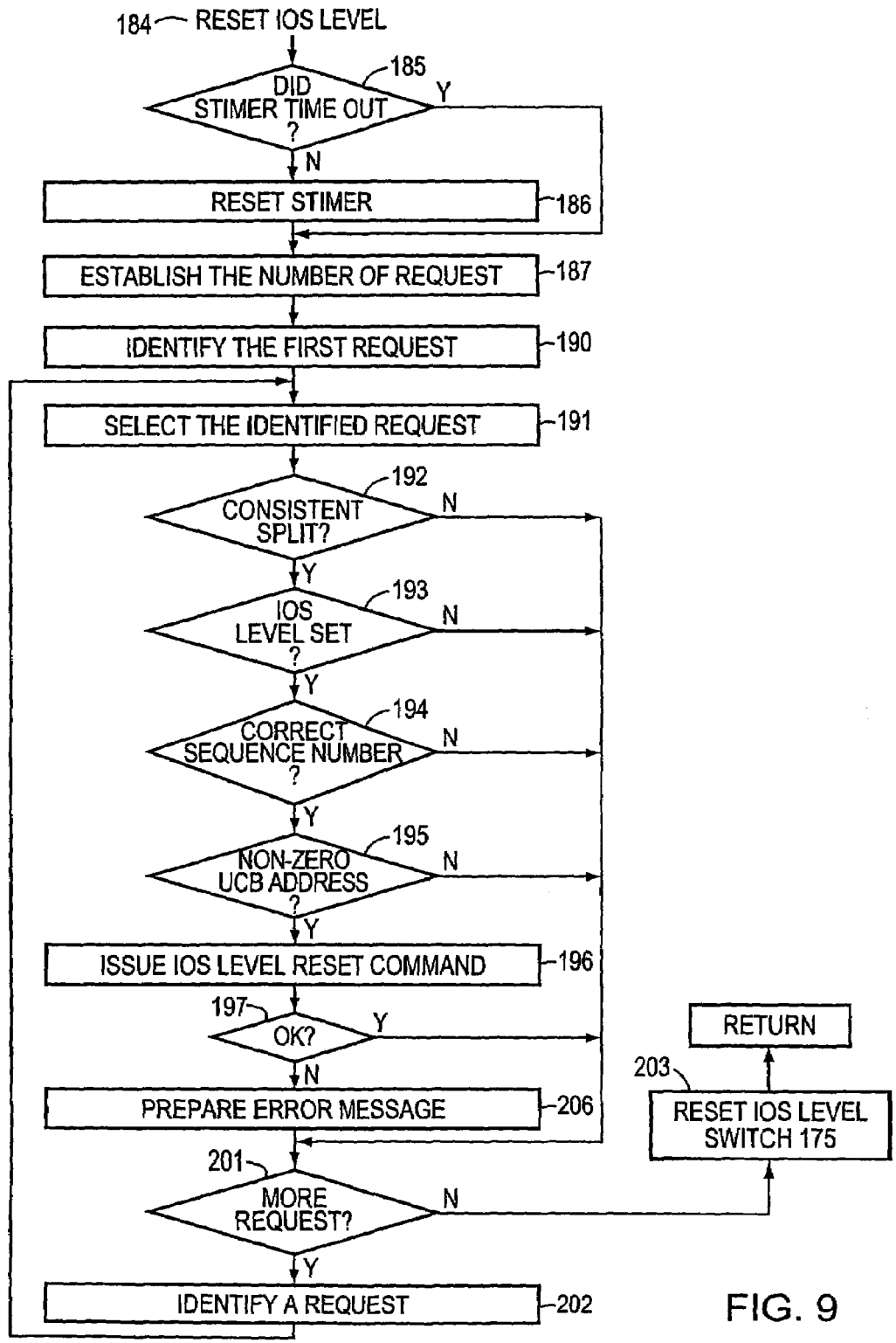
FIG. 9 is a flow diagram of a RESET IOS LEVEL procedure shown in FIG. 6.

Step 185 in FIG. 9 determines whether the STIMER timed out. Specifically if the operation f or the RUN STARTIO procedure does not terminate within the allotted time, a timeout occurs. When STIMER timeout occurs in an MVS operating system, another MVS operating system utility detects that event and initiates appropriate responses. Within the TF application, however, further responses are needed whether the STIMER times out or not. If it does not, control passes from step 185 to step 186 to reset the timer. In any event step 187 then determines the number of requests for which the IOS level has been set. Step 190 identifies a first request that is selected in step 191. Steps 192, 193, 194 and 195 then test various features to determine whether to issue an IOS LEVEL RESET command in step 196. Specifically if the CONSISTENT SPLIT flag 101 is set, an IOS LEVEL flag 158 is set, the sequence number matches the sequence number set forth in step 86 in FIG. 4, and the UCB address is not zero, step 196 issues an IOS LEVEL RESET command and clears the corresponding IOS LEVEL flag otherwise the IOS level flag is not altered. If this does not occur satisfactorily, step 197 transfers control to step 206 that prepares an appropriate error message. Thereafter step 201 determines whether more REQB data structures need review.

If the reset command is completed satisfactorily, step 197 transfers control directly to step 201. If more REQB data structures exists, step 202 identifies a next REQB data structure and transfers control back to 191. When the loop comprising steps 191 through 202 has examined all the REQB data structures, step 201 transfers control to step 203 to reset a global IOS LEVEL switch 175. Then the system returns to FIG. 6 whereupon step 204 completes various procedure and terminates the subroutine. Control then passes to step 67 in FIG. 3 to determine if any errors occurred and to initiate analysis of a next command. As previously indicated when all the requests are completed, the next sequence number is selected and the process repeats for each request having that sequence number. When all the sequences are complete the process is completed housekeeping occurs and the TF application completes.

This invention has been disclosed in FIG. 1 through 9 in terms of various hardware and software modules that provide for splitting multiple related BCV devices from standard devices with consistency in response to a particular command or series of commands. As will be apparent, the time required to perform these functions, particularly between the time an IOS level is raised in step 160 in FIG. 6 and reset in step 184, will be in the order of a few seconds. As previously indicated a default value of 15 seconds is used although users can in this particular embodiment identify even shorter intervals. Such times involved for splitting hundreds of BCV devices is tolerable.

The advantage gained is that the data is consistent. Consequently if a problem occurs in the operation of the standard devices, recovery of the data backed up from the BCV devices after a consistent split, is greatly facilitated because it can be assumed that the data is coherent. This assures that any errors are readily detectable. For example, with a dependent data transfer, even if a split occurs after the first log entry or after the data is transferred but before the second log entry is made, a diagnostic program that monitors the log can easily determine that the second log entry is not present and then either automatically reconstruct the data associated with the log or complete the log. Other enhancements to the recovery and other processes will also be apparent to those of ordinary skill in the art as a result of having this consistent data back up on multiple BCV devices.

This invention has been disclosed with respect to a particular embodiment of a TF application for use with a disk array storage device available from the assignee of this invention in association or operating with a particular third party operating system. It will be apparent, however, that other procedures might be used to implement the specific functions shown in FIGS. 3 through 9 and other structures might be substituted for this particular data structures and registers such shown in FIG. 2. Still other changes might be used if such a system were utilized with another operating system.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. In a data processing system including a host and at least one disk array storage device including a plurality of first logical devices for interacting with a first application and that constitute a consistency group and at least one second logical device for interacting in a first mode as a mirror for a corresponding one of the first logical devices in the consistency group, a method for enabling the shift of the second logical devices to the second mode in a consistent manner whereby each second logical device can interact with a second application with read and write capabilities, said method for shifting to the second mode comprising the steps of:

A) generating a request data structure for each second logical device in the consistency group, B) preventing write operations to each of the first logical devices in the consistency group associated with the second logical devices identified in the request data structure, C) shifting each of the at least one identified second logical device in the consistency group to the second mode after said write prevention operation occurs, and D) enabling write operations to all the first logical devices in the consistency group upon completion of said shifting whereby interactions between the first application and all the first logical devices in the consistency group resume and whereby the second application can interact with the second logical devices in the consistency group.

2. A method as recited in claim 1 wherein the disk array storage device includes a buffer and a write operation includes a first transfer of data from a host to the buffer as a write pending entry and a second transfer of the write pending entry to a logical device and wherein said shifting of a second logical device to the second mode includes detaching the second logical device from its corresponding first logical device, attaching the second logical device to the second application and managing the transfer of write pending entries in the buffer, said shift of the identified second logical devices including said detaching and attaching steps.

3. A method as recited in claim 2 wherein said managing of write pending entry transfers occurs after said write operations to said first logical devices resume.

4. In a data processing system including host and at least one disk array storage device including a plurality of first logical devices for interacting with a first application and that constitute a consistency group and a second logical device that interacts in a first mode as a mirror at least one of the first logical devices in the consistency group, a control means for enabling the shift of each of the second logical devices to a second mode in a consistent manner whereby each second logical device can interact with a second application with read and write capabilities, said controller comprising:

A) request means for generating a request data structure for second logical device in the consistency group, B) locking means for preventing write operations to any of the first logical devices associated with the second logical devices in the consistency group, C) mode shift means initiating a shift all of the identified second logical devices in the consistency group to the second mode after said write prevention occurs, and D) unlocking means for enabling write operations to all the first logical devices in the consistency group upon completion of said shifting whereby interactions between the first application and all the first logical devices in the consistency group resume and whereby the second application can interact with a second logical device in the consistency group.

5. A system as recited in claim 4 wherein the disk array storage device includes a buffer and a write operation includes a first transfer of data from a host to the buffer as a write pending entry and a second transfer of the write pending entry to a logical device and wherein said shifting of a second logical device to the second mode includes detaching the second logical device from its corresponding first logical device, attaching the second logical device to the second application and managing the transfer of write pending entries in the buffer, said interaction means enabling the resumption of interaction between the first application and corresponding first logical devices after the detaching and attaching of all the identified second logical devices.

6. A system as recited in claim 4 wherein each of said identified second logical devices includes means for managing write pending entry transfers after said interaction means enables the resumption of interactions between the first application and the first logical devices.

7. A program stored on a computer-readeable medium for operation in a data processing system including a host and at least one disk array storage device including a plurality of first logical devices for interacting with a first application and that constitute a consistency group and at least one second logical device for interacting in a first mode as a mirror for a corresponding one of the first logical devices in the consistency group, the program enabling the shift of the second logical devices to the second mode in a consistent manner whereby each second logical device can interact with a second application with read and write capabilities, said program comprising:

A) a module for generating a request data structure for each second logical device in the consistency group, B) a module for preventing write operations to each of the first logical devices in the consistency group associated with the second logical device identified in the request data structure, C) a module for initiating a shift all of the identified second logical devices in the consistency group to the second mode after said write operation prevention, and D) a module for enabling write operations to all the first logical devices in the consistency group upon completion of said shifting whereby interactions between the first application and all the first logical devices in the consistency group resume and whereby the second application can interact with the second logical devices in the consistency group.

8. A program as recited in claim 7 wherein the disk array storage device includes a buffer and a write operation includes a first transfer of data from a host to the buffer as a write pending entry and a second transfer of the write pending entry to a logical device and wherein said shift initiating module detaches the second logical device from its corresponding first logical device, attaches the second logical device to the second application and a write pending module manages the transfer of write pending entries in the buffer.

9. A program as recited in claim 8 wherein said write pending module manages write pending entry transfers after said write operations to said first logical devices resume. program stored on a computer-readable medium.

* * * * *